US011736307B2

(12) United States Patent
Bahl

(10) Patent No.: US 11,736,307 B2
(45) Date of Patent: Aug. 22, 2023

(54) AUTOMATIC DISCOVERY AND LOCALIZATION OF VOICE DEGRADATION FAULTS USING ULTRASOUND TECHNIQUES

(71) Applicant: Cisco Technology, Inc., San Jose, CA (US)

(72) Inventor: Rohit Bahl, Kanata (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/231,316

(22) Filed: Apr. 15, 2021

(65) Prior Publication Data
US 2022/0337442 A1    Oct. 20, 2022

(51) Int. Cl.
*H04L 12/18* (2006.01)
*G10L 19/24* (2013.01)
*G10L 19/16* (2013.01)

(52) U.S. Cl.
CPC ........ *H04L 12/1827* (2013.01); *G10L 19/167* (2013.01); *G10L 19/24* (2013.01); *H04L 12/1822* (2013.01)

(58) Field of Classification Search
None
See application file for complete search history.

(56) References Cited

U.S. PATENT DOCUMENTS

| 8,467,321 | B1 | 6/2013 | Groenjes et al. | |
|---|---|---|---|---|
| 9,560,316 | B1 | 1/2017 | Lindberg | |
| 2009/0238085 | A1 | 9/2009 | Khanduri | |
| 2017/0104867 | A1 | 4/2017 | Kim et al. | |
| 2019/0164563 | A1* | 5/2019 | Volcker | H04M 3/2236 |
| 2020/0274911 | A1* | 8/2020 | Gargaro | G10L 25/60 |
| 2020/0280812 | A1* | 9/2020 | Boss | H04L 65/403 |

OTHER PUBLICATIONS

Zoom, "Testing Computer or Device Audio," retrieved from https://support.zoom.us/hc/en-us/articles/201362283-Testing-computer-or-device-audio, on Apr. 15, 2021, 5 pages.
(Continued)

*Primary Examiner* — Kevin S Mai
(74) *Attorney, Agent, or Firm* — Edell, Shapiro & Finnan, LLC

(57) ABSTRACT

A method comprises, at a local participant device, establishing audio connections with remote participant devices over a network for an online voice conference. The method includes generating ultrasound signals for corresponding ones of the remote participant devices, and transmitting the ultrasound signals over corresponding ones of the audio connections. The method further includes collecting indications, transmitted by corresponding ones of the remote participant devices over the network, that indicate whether the corresponding ones of the remote participant devices detected the ultrasound signals. The method includes identifying which of the remote participant devices detected the ultrasound signals based on the indications, and localizing degraded voice quality to particular ones of the local participant device and the remote participant devices based, at least in part, on results of identifying.

20 Claims, 11 Drawing Sheets

(56) References Cited

OTHER PUBLICATIONS

Johnson, "Zoom is Bringing Ultrasonic Signatures to Business Call to Deter Leaks," VentureBeat, Jan. 22, 2019, https://venturebeat.com/2019/01/22/zoom-is-bringing-ultrasonic-signatures-to-business-calls-to-deter-leaks/, 11 pages.

Evans, "How to Troubleshoot Zoom," PingPlotter, retrieved from https://www.pingplotter.com/wisdom/solutions/how-to-troubleshoot-zoom, on Apr. 15, 2021, 6 pages.

Avaya, "Release Notes for Avaya IX Collaboration Unit CU360," Version 10.1.0.23, Jul. 2019, https://downloads.avaya.com/css/P8/documents/101059355, 94 pages.

University of Illinois at Urbana-Champaign, "Sound Inaudible To Humans Can Be Recorded By Microphones," Tech Briefs, Apr. 1, 2018, https://www.techbriefs.com/component/content/article/tb/pub/techbriefs/communications/28702, 3 pages.

Microsoft, Audio Choppy and Cutting Out on Skype-To-Skype Video Call (Windows 10), Jan. 6, 2019, https://answers.microsoft.com/en-us/skype/forum/all/audio-choppy-and-cutting-out-on-skype-to-skype/48ee8957-bd32-4c90-ba99-e325811c8f6e, 4 pages.

Opus, "Opus Interactive Audio Codec," Oct. 23, 2020, https://opus-codec.org/, 4 pages.

\* cited by examiner

AUTOMATIC DISCOVERY AND LOCALIZATION OF VOICE DEGRADATION FAULTS USING ULTRASOUND TECHNIQUES

TECHNICAL FIELD

The present disclosure relates to ultrasound-based techniques for detecting and localizing voice quality degradation in an online conference.

BACKGROUND

Virtual meetings or conferences fundamentally depend on a large number of underlying software and hardware technologies coupled with networking connectivity to deliver an acceptable meeting experience to participants. A pervasive issue encountered in such conferences occurs when a participant complains that an utterance by another participant is/was inaudible either entirely or partially due to chopping-up of voice/sound. This type of problem causes annoying interruptions when a focus of the meeting then changes to either repeating utterances and/or a side activity that attempts to discover the cause of degraded sound quality (on the sender side or the receiver side). This "hunting exercise" further degrades the meeting experience.

DESCRIPTION OF EXAMPLE EMBODIMENTS

Overview

In an embodiment, a local participant device establishes audio connections with remote participant devices over a network for an online voice conference. The local participant device generates ultrasound signals for corresponding ones of the remote participant devices, and transmits the ultrasound signals over corresponding ones of the audio connections. The local participant device collects indications, transmitted by corresponding ones of the remote participant devices over the network, of whether the corresponding ones of the remote participant devices detected the ultrasound signals. The local participant device identifies which of the remote participant devices detected the ultrasound signals based on the indications. The local participant device localizes degraded voice quality to particular ones of the local participant device and the remote participant devices based, at least in part, on results of identifying.

In another embodiment, a participant device establishes audio connections with remote participant devices over a network for an online voice conference. The participant device receives, from a meeting supervisor of the online voice conference, a digital identifier for one of the remote participant devices and a pulse signal periodicity. The participant device listens to the audio connections for a periodic ultrasound signal having the pulse signal periodicity and that is encoded with the digital identifier. When the periodic ultrasound signal is detected or is not detected based on listening, the participant device generates an ultrasound confirmation message that includes an identifier of the participant device and a first indication of whether the periodic ultrasound signal was detected or was not detected, respectively. The participant device transmits the ultrasound confirmation message to the meeting supervisor.

EXAMPLE EMBODIMENTS

Figure 1:
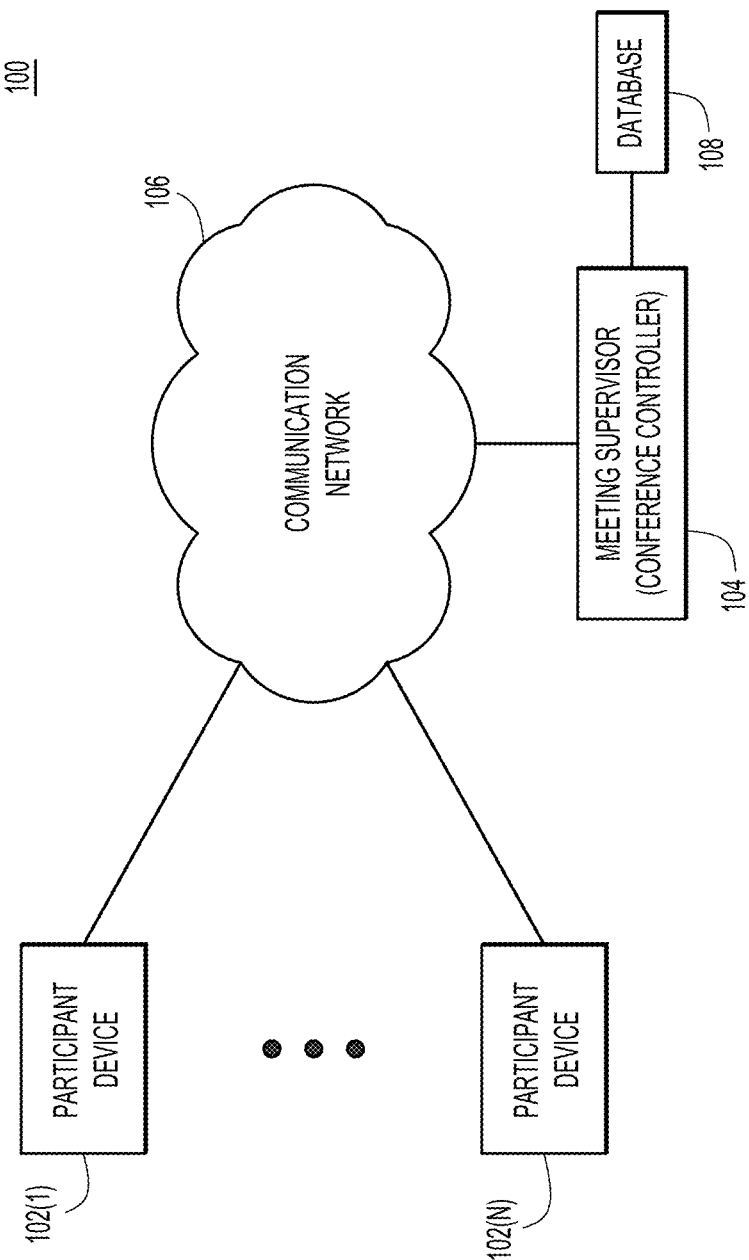
FIG. 1 is a block diagram of a voice conference system that implements ultrasound-based localization of voice quality degradation during an online voice conference, according to an example embodiment.

Referring first to FIG. 1, there is a block diagram of an example voice conference system 100 that implements ultrasound-based localization of voice quality degradation during an online voice conference. As used herein, the term "voice conference" means any conference to which participant devices may join to exchange at least voice communications; however, the voice conference may also support exchanges of multimedia information, such as text, video, graphics, and so on. In addition, "ultrasound" is defined as audio frequencies above 20 kHz, while "near ultrasound" is defined as audio frequencies from approximately 18 kHz to 20 kHz.

Voice conference system 100 includes multiple participant devices 102(1)-102(N) (collectively referred to as participant devices 102) operated by local users/participants, a meeting supervisor or server (also referred to as a "conference controller") 104, and a communication network 106 communicatively coupled to the participant devices and the meeting supervisor. Participant devices 102 can take on a variety of forms, including a SmartPhone, tablet, laptop computer, desktop computer, video conference (e.g., Telepresence) endpoint, and the like. At least some of participant devices 102 include ultrasound-capable microphones (i.e., microphones capable of transducing ultrasound) to detect voice and ultrasound, and ultrasound-capable loudspeakers (i.e., loudspeakers capable of transducing ultrasound) to playback voice and ultrasound.

Communication network 106 may include one or more wide area networks (WANs), such as the Internet, and one or more local area networks (LANs). Participant devices 102 may communicate with each other, and with meeting supervisor 104, over communication network 106 using a variety of known or hereafter developed communication protocols. For example, the participant devices 102 and meeting supervisor 104 may exchange Internet Protocol (IP) data packets, Real-time Transport Protocol (RTP) media packets (e.g., audio and video packets), and so on.

Meeting supervisor 104 may include a cloud-based meeting application hosted on one or more servers, for example. Meeting supervisor 104 serves as a conference connection manager configured to establish and support web-based (i.e., online or over-a-network) voice conferences for participant devices 102, through which users of the participant devices can exchange voice communications. Meeting supervisor 104 includes a database 108 for storing status and other information associated with participant devices engaged in voice conferences, as described below. Meeting supervisor 104 and participant devices 102 may each access the information stored in database 108 either directly or indirectly.

Participant devices 102 connect with meeting supervisor 104 to join/establish a voice conference. With support from meeting supervisor 104, participant devices 102 establish audio connections or channels with each other over network 106, and over which audio packets are exchanged while the voice conference is active. The audio connections may or may not pass through meeting supervisor 104. The audio connections may employ media transport protocols, such as RTP, to convey audio packets from a presenter/sender device to a listener/receiver device among participant devices 102.

In a voice conference, degraded voice quality at a presenter/sender or a listener/receiver side of the conference can seriously harm the meeting experience, as described above. Identifying the source of such degraded voice quality can be difficult. It is desirable to detect the source seamlessly and proactively, without launching a hunting exercise among the participants. Accordingly, embodiments presented herein automatically and proactively detect and identify issues of degraded voice quality in a voice conference, and locate where the issue exists, whether at the presenter/sender or the listener/receiver. As will be described below, the embodiments employ ultrasound-based techniques to localize degraded voice conditions to particular participant devices in the voice conference. An advantage of using ultrasound, which is inaudible, is that the techniques may be conducted concurrently with regular voice/speech communication, without interfering with such voice/speech.

Figure 2:
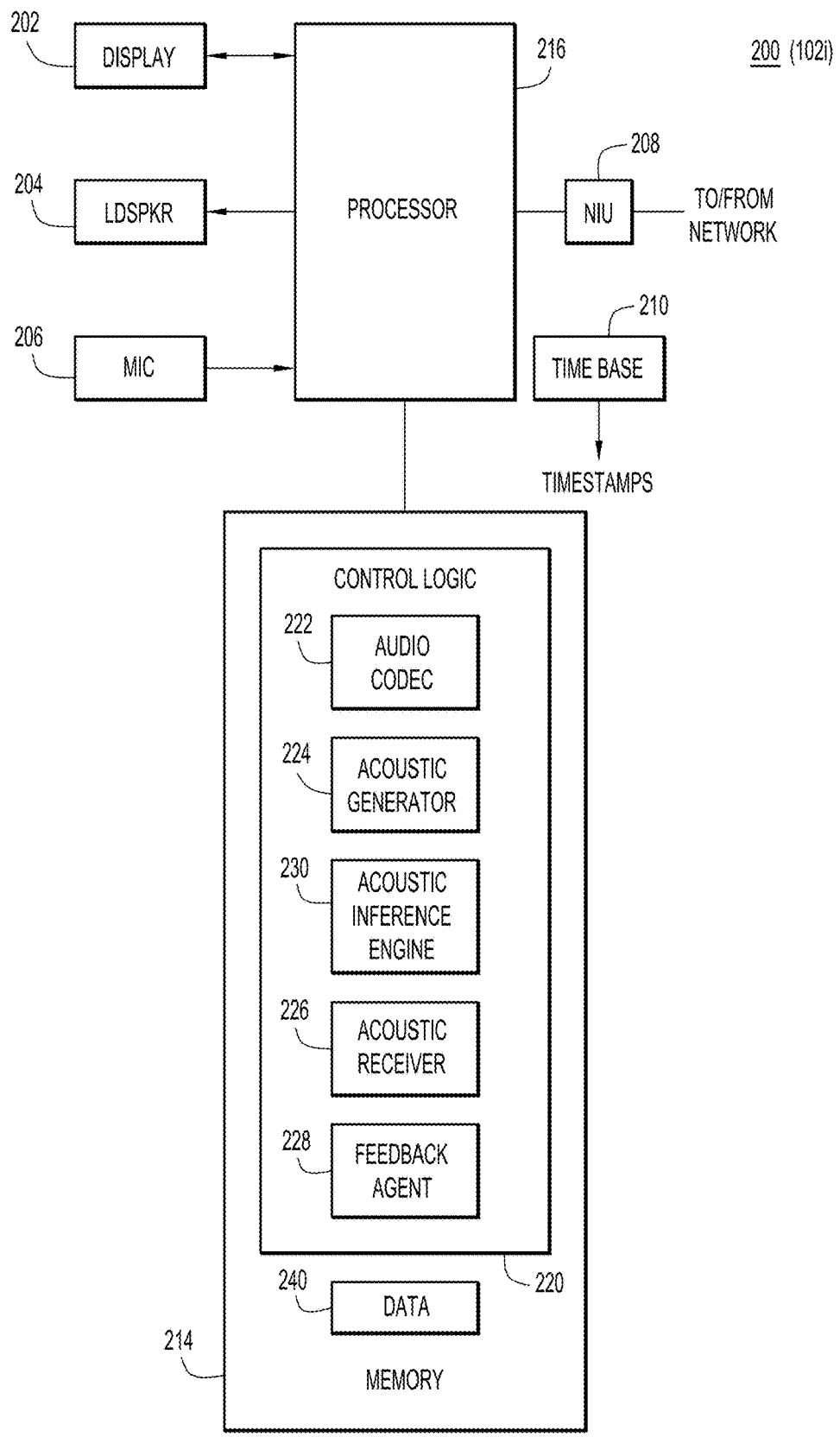
FIG. 2 is a block diagram of a participant device representative of participant devices of the voice conference system, according to an example embodiment.

With reference to FIG. 2, there is a block diagram of an example participant device 200 representative of any of participant devices 102(i). There are numerous possible configurations for participant device 200 and FIG. 2 is meant to be an example. Participant device 200 may include a display 202, a loudspeaker 204, a microphone 206, one or more network interface units (NIUs) 208, a timebase 210, and memory 214 each coupled to a processor 216. The one or more NIUs 208 may be implemented in hardware and/or software, and include wired and/or wireless connection capability that allows processor 216 to communicate over a communication network. For example, NIUs 208 may include an Ethernet card to communicate over an Ethernet connection, a wireless radio frequency (RF) transceiver to communicate wirelessly with cellular networks in the communication network or with a WiFi® network, optical transceivers, and the like, as would be appreciated by one or ordinary skill in the relevant arts. Timebase 210 may include one or more oscillators and/or clocks configured to generate timestamps.

Processor 216 may be implemented in hardware, and may include a collection of microcontrollers and/or microprocessors, for example, each configured to execute respective software instructions stored in the memory 214. The collection of microcontrollers may include, for example: a video controller to receive, send, and process video signals or images related to display 202; and an audio processor to receive, send/transmit, and process audio/sound signals related to loudspeaker 204 and microphone 206, as described herein. Portions of memory 214 (and the instructions therein) may be integrated with processor 216.

The memory 214 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 214 may comprise one or more computer readable storage media (e.g., a memory device) encoded with software comprising computer executable instructions and when the software is executed (by the processor 216) it is operable to perform the operations described herein. For example, the memory 214 stores or is encoded with instructions for control logic 220 to perform operations described herein.

Control logic 220 may include an audio codec (also referred to simply as a "codec") 222, an acoustic generator 224, an acoustic receiver 226, a feedback agent 228, and an acoustic inference engine 230 (also referred to simply as an "inference engine 230"). Briefly, the aforementioned control logic components perform the following functions:

a. Acoustic generator 224 generates a periodic ultrasound waveform having a known periodicity and encoded with a unique digital identifier (ID) or signature corresponding to participant device 200, i.e., the ultrasound waveform is unique to participant device 200.

b. Audio codec 222 is an audio coder/decoder configured to encode audio, in both the voice frequency range (i.e., up to 20 kHz) and in the ultrasound frequency range (i.e., above 20 kHz), into audio packets. In a transmit direction, audio codec 222 encodes time slices of (i) voice detected by microphone 206, and (ii) the ultrasound waveform into respective audio packets that convey the voice or the ultrasound waveform, depending on which is applied to an input of the audio code. In a receive direction, audio codec 222 decodes audio packets, to recover either voice or ultrasound conveyed by the audio packets. In an example, audio codec 222 may include an OPUS full-band audio codec that is based on a 48 kHz sampling rate, which enables encoding and decoding of ultrasound up to 24 kHz.

c. Inference engine 230 is configured to obtain/collect indications transmitted by participant devices connected to a voice conference and that indicate whether the participant devices have detected or not detected ultrasound signals transmitted by (i) participant device 200, or (ii) themselves in local ultrasound loopback tests, described in more detail below. Inference engine 230 localizes degraded voice quality to participant device 200 and the other participant devices connected to the conference based on the indications.

d. Feedback agent 228 collects status information for participant device 200 and transmits the status information to a network.

e. Acoustic receiver 226 interacts with audio codec 222 to perform operations described below.

Memory 214 also stores data 240 used and generated by processor 216/control logic 220.

Figure 3:
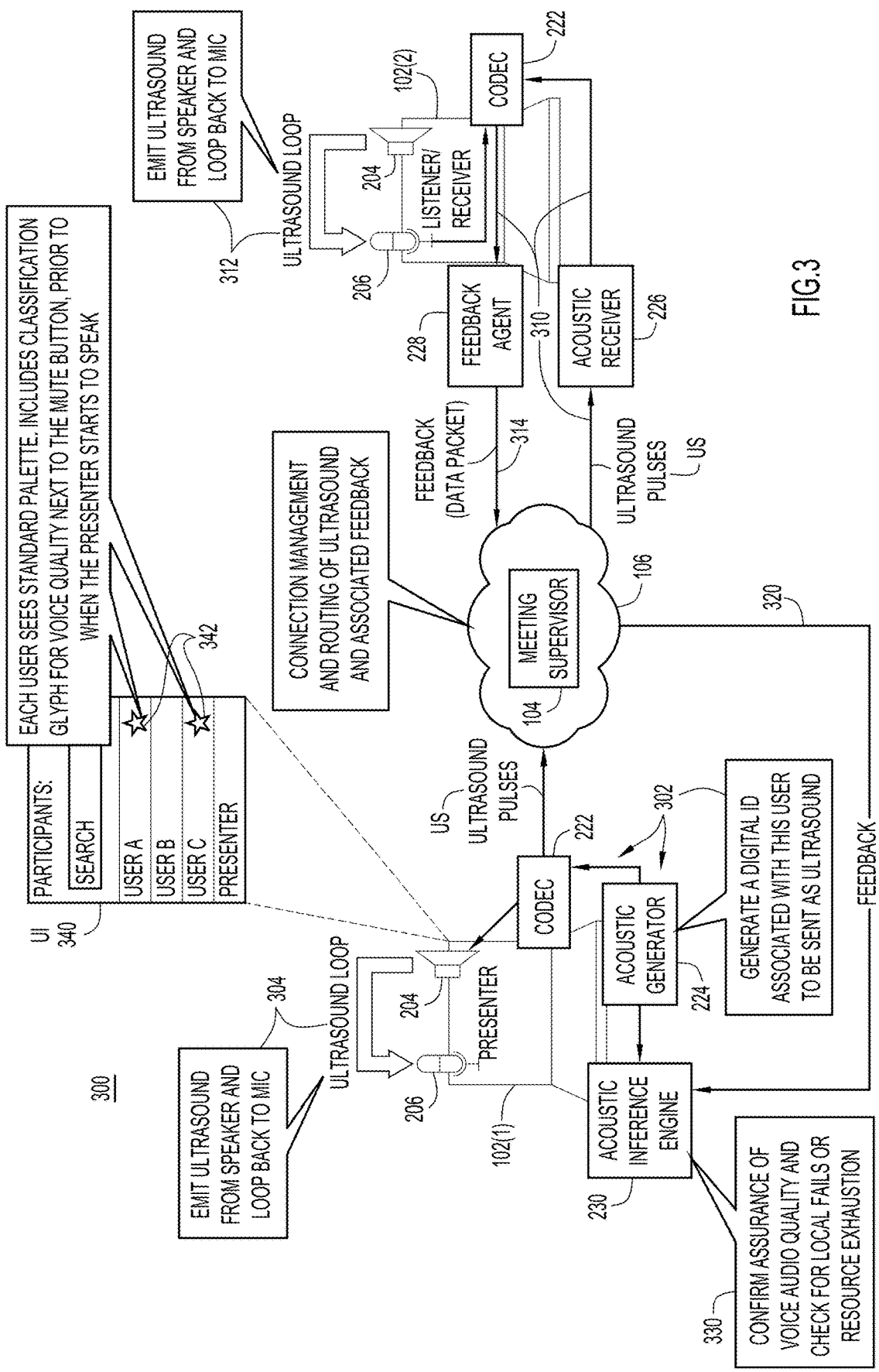
FIG. 3 is an illustration of ultrasound-based localization of voice quality degradation to particular participant devices when they are engaged in an online voice conference, according to an embodiment.

With reference to FIG. 3, there is an illustration of an example 300 of ultrasound-based localization of voice quality degradation to participant devices engaged in a voice conference. In the example of FIG. 3, participant device 102(1) has established an audio connection with participant device 102(2) for a voice conference, under supervision of meeting supervisor 104. Participant device 102(1) has assumed the role of a presenter/sender and is referred to as the "presenter," while participant device 102(2) has assume the role of a listener/receiver and is referred to as the "receiver." The roles may be reversed in another example. FIG. 3 shows a single receiver for simplicity; in practice, there may be a large number of receivers.

In the arrangement depicted in FIG. 3, meeting supervisor 104 serves as a broker between the various participant devices (e.g., participant device 102(1) and participant device 102(2)) engaged in the voice conference. As will be described, meeting supervisor 104 may relay ultrasound signals from the presenter to the receiver, and sends feedback in the form of data messages (e.g., data packets, not ultrasound signals) from the receiver to the presenter. The presenter uses the feedback to make degraded voice localization decisions.

Focusing initially on the presenter, at 302, the presenter uses acoustic generator 224 and audio codec 222 to generate a unique ultrasound signal US that includes periodic ultrasound pulses each encoded with a unique digital ID associated with the presenter. The periodic ultrasound pulses have a periodicity (i.e., a pulse interval or time period between successive ultrasound pulses) that may be established/configured by meeting supervisor 104 and communicated to the presenter and the receiver (e.g., in respective messages sent by the meeting supervisor to the presenter and the receiver), when the conference is initially established. Alternatively, the presenter and the receiver may communicate with each other to negotiate an agreed upon periodicity. The presenter timestamps each of the periodic ultrasound pulses of unique ultrasound signal US. For example, the presenter may embed a timestamp into audio packets that convey unique ultrasound signal US. The presenter transmits unique ultrasound signal US to network 106. Meeting supervisor 104 receives unique ultrasound signal US, and routes it to the receiver. In another embodiment, the presenter may transmit unique ultrasound signal US directly to the receiver, without routing through meeting supervisor 104.

At 304, the presenter performs a local ultrasound loopback test on itself. Specifically, (i) audio codec 222 provides timestamped, unique ultrasound signal US (or a different ultrasound signal) to local loudspeaker 204, (ii) the local loudspeaker plays the ultrasound signal into the local environment, (iii) local microphone 206 senses or detects the ultrasound in the environment, and provides the detected ultrasound to the audio codec, and (iv) the audio code decodes the detected ultrasound signal to recover its unique digital ID, timestamps the unique digital ID, and provides the timestamped unique digital ID to inference engine 230. Other arrangements for the loopback test are possible.

Now focusing on the receiver (e.g., 102(2)), once the voice conference has been established, at 310, the receiver listens for, and expects to receive/detect, unique ultrasound signal US (i.e., the periodic ultrasound pulses having the established periodicity and that are encoded with the unique digital ID of the presenter). While in this "listening mode," the receiver uses acoustic receiver 226 and audio codec 222 to detect the periodic ultrasound pulses, recover the unique digital ID of the presenter from the pulses, and recover the timestamps associated with the pulses. Receiver logic associated with audio codec 222 determines whether the unique ultrasound signal is detected successfully, i.e., that the periodicity of detected pulses is correct (i.e. matches the expected periodicity), and the pulses are not delayed, which is determined based on the timestamps. The receiver logic indicates, to feedback agent 228, whether unique ultrasound signal US has been detected or not detected successfully.

At 312, the receiver performs its own local ultrasound loopback test, similar to that performed by the presenter at 304. A pass/fail result of the local ultrasound loopback test is provided to feedback agent 228.

Feedback agent 228 receives the pass/fail result for the local ultrasound loopback test performed at 312, and receives the ultrasound signal detection results from operation 310. Feedback agent 228 generates an ultrasound confirmation message based on the foregoing information. The ultrasound confirmation message includes (i) an identifier of the receiver (e.g., an IP address, a device ID (such as media access control (MAC) address or other ID), a participant ID, and the like), (ii) the unique digital ID of the presenter, and (iii) status indicators to indicate whether the unique ultrasound signal transmitted by the presenter was detected successfully or was not detected successfully, and whether the local ultrasound loopback test performed by the receiver passed or failed.

At 314, feedback agent 228 sends the ultrasound confirmation message to meeting supervisor 104 as a data packet (e.g., an IP packet) with a header to indicate that the data packet is an "ultrasound confirmation message." Upon receiving the ultrasound confirmation message, meeting supervisor stores the receiver ID, the presenter ID, and the status indication(s) from the message in a receiver record/entry of database 108.

Returning to the presenter, at 320, the presenter collects/obtains receiver records from one or more databases. For example, the presenter sends a request for receiver records for the conference session (e.g., using a conference session ID) to meeting supervisor 104. Upon receiving the request, meeting supervisor 104 retrieves all receiver records for the voice conference using the conference session ID as an index, and sends the receiver records to the presenter. In addition, the presenter may maintain a local database that mirrors the information in database 108, and may periodically synchronize information in the local database to that in database 108, to keep the information current. In that case, the presenter may simply collect the receiver records from its local database.

Armed with the receiver records, and results of the local ultrasound loopback test for the presenter, at 330, the presenter (e.g., inference engine 230), localizes degraded audio quality to various ones of the participants, e.g., to the presenter, the receiver, or both, based on the receiver records, the results of the local ultrasound loopback test, and other information. In other words, the presenter determines which of the presenter and the receiver are experiencing degraded audio quality based on the results of the loopback test and the receiver records. Example results of localization may include, but are not limited to, the following:

a. When the local ultrasound loopback test (of presenter) passes and the receiver records indicate that the receiver has not detected unique ultrasound signal US, localize degraded voice quality to the receiver, only.

b. When the local ultrasound loopback test (of presenter) fails and the receiver record indicates that the receiver has detected unique ultrasound signal US, localize degraded voice quality to the presenter, only.

Further localization results are described below.

After localizing faults/degradation, the presenter generates, for display, user interface (UI) information that indicates the localization results, e.g., that indicates which of the presenter and the receiver are experiencing degraded voice quality. The presenter displays the localization results on a local UI 340. UI 340 presents a window palate that lists participants of the voice conference and a visual voice quality indicator (e.g., a classification glyph) 342 associated with each of the participants. The voice quality indicator indicates whether the voice quality is degraded or not degraded. In an example, the voice quality indicator may also include a score ranging from 1-4 to indicate a range of voice qualities from poor to good. The presenter sends the UI information with the localization result to the receiver, which also displays the visual voice quality indicators.

Figure 4:
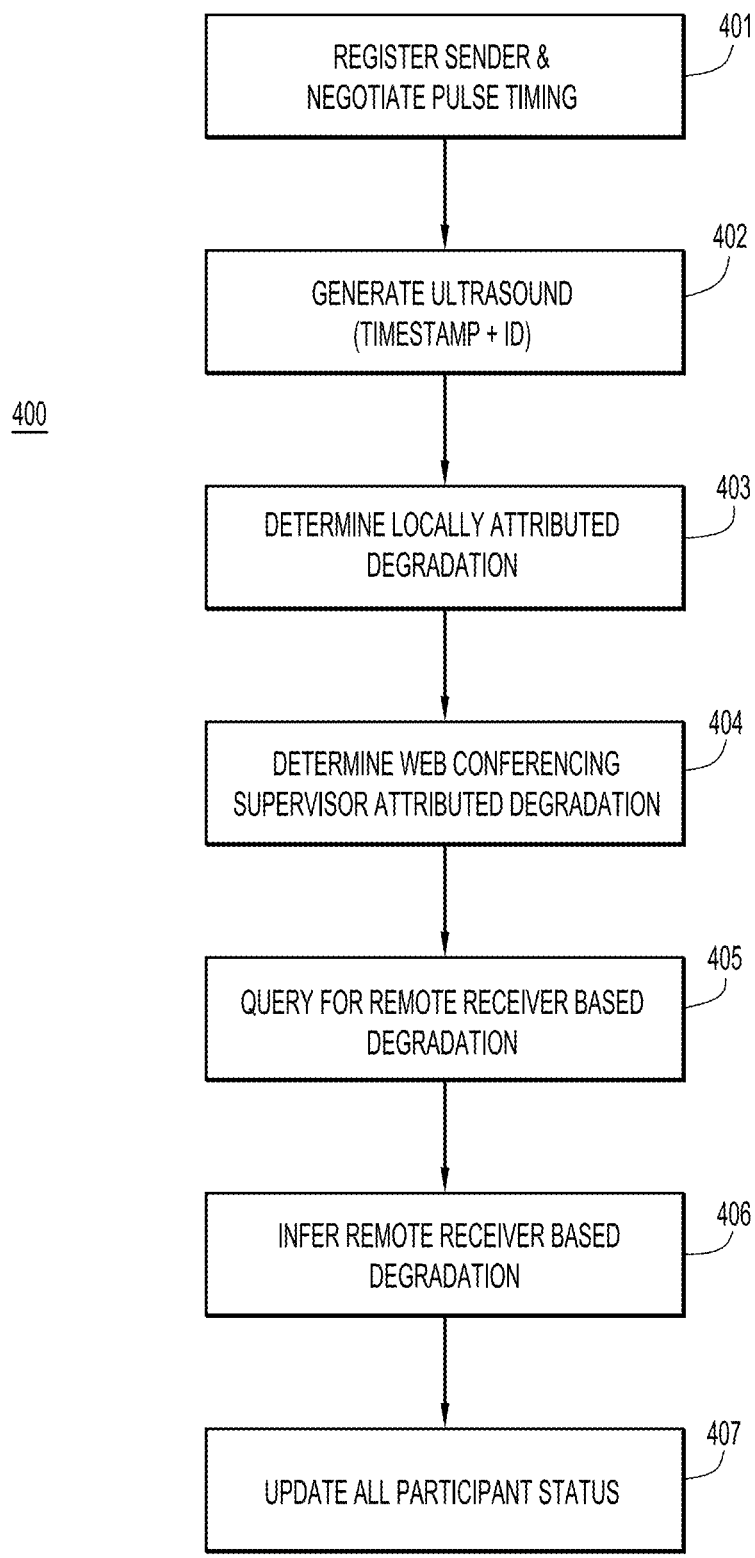
FIG. 4 is a flowchart of a method of localizing degraded voice quality to particular participant devices in an online voice conference, performed by a participant device operating in a sender role, according to an example embodiment.
Figure 5:
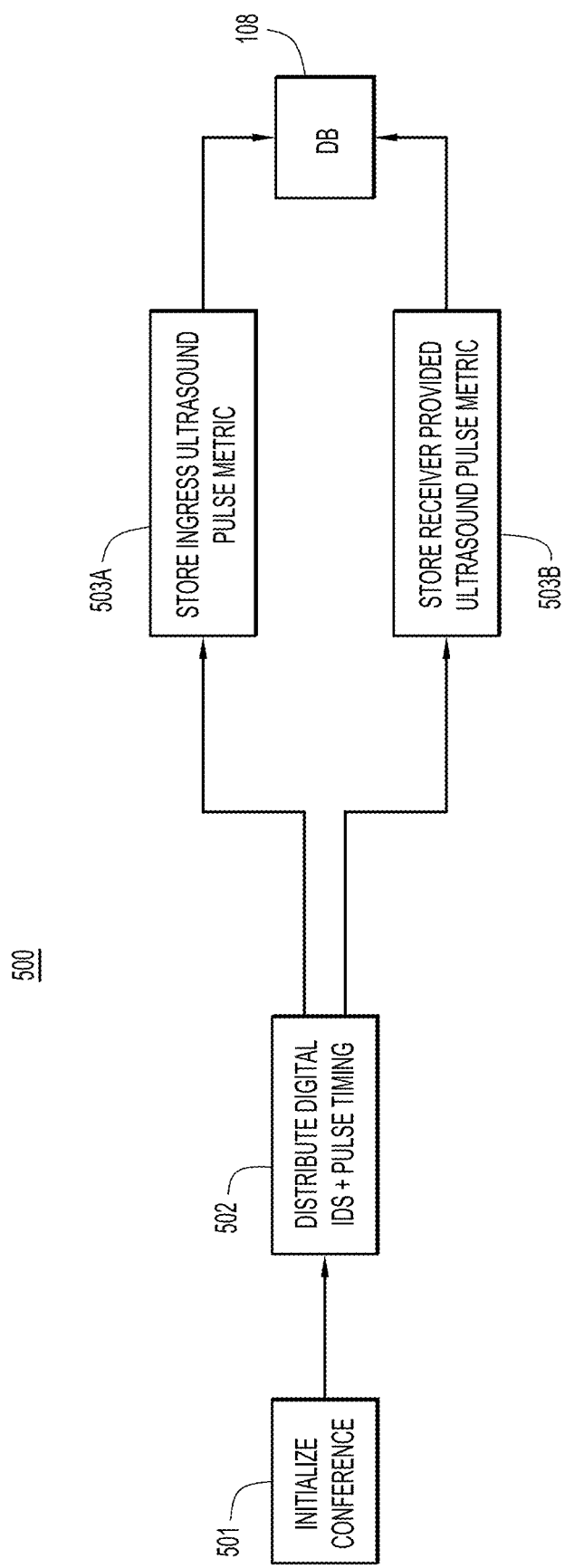
FIG. 5 is a flowchart of a method of supporting localizing degraded voice quality to particular participant devices in an online voice conference, performed by a meeting supervisor of the voice conference system, according to an example embodiment.
Figure 6:
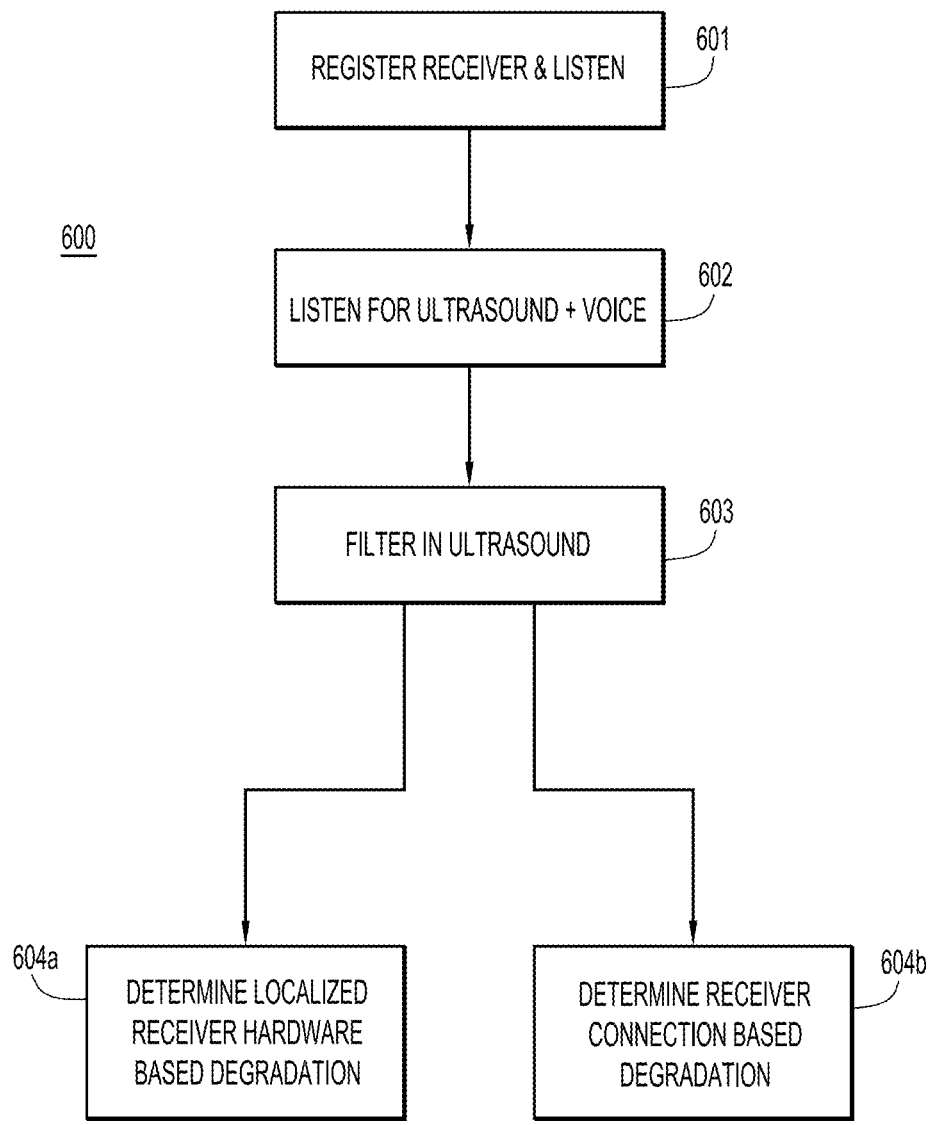
FIG. 6 is a flowchart of a method of supporting localizing degraded voice quality to particular participant devices in an online voice conference, performed by a participant device operating in a listener/receiver role, according to an example embodiment.

FIGS. 4, 5, and 6 respectively depict operations for ultrasound-based localization of voice quality degradation in a voice conference performed by a sender, a meeting supervisor, and a listener/receiver.

With reference to FIG. 4, there is a flowchart of an example method 400 of localizing degraded voice quality to particular participant devices among participant devices engaged in an online voice conference, performed by a participant device (e.g., participant device 102(1)) operating as a presenter/sender among the participant devices (e.g., among participant devices 102(1)-102(N)). The description of method 400 refers to participant devices simply as "participants." In addition, the participant performing method 400 (i.e., the sender) may be referred to as a "local participant," while the other participants in the online conference may be referred to as "remote participants," with respect to the local participant. In method 400, the participants and meeting supervisor 104 communicate with each other over network 106.

At 401, the (local) participant sends, to meeting supervisor 104, a request to join a voice conference and to register as a sender. Upon receiving the request, meeting supervisor 104 registers the participant as a sender, and sends pulse timing information (e.g., periodicity) and optionally a unique digital ID to the participant, which receives the information. In addition, under supervision of meeting supervisor 104, the participant establishes audio connections/channels with the remote participants, e.g., establishes a respective audio connection with each of the remote participants.

At 402, the participant generates unique ultrasound signals for corresponding ones of the remote participants based on the periodicities and unique digital ID provided by meeting supervisor 104, and transmits each of the unique ultrasound signals over a corresponding one of the audio connections. Each unique ultrasound signal includes time-stamped, periodic ultrasound pulses having the periodicity provided by meeting supervisor 104 or otherwise negotiated. Each of the periodic ultrasound pulses may be encoded with the unique digital ID of the participant. For example, to generate the unique ultrasound signals, the participant may employ an audio codec that operates at ultrasound to encode an ultrasound waveform that represents the unique digital ID into audio packets that convey the ultrasound information, and that also convey timestamps.

In addition, the audio codec of the participant encodes voice, when detected by the local microphone, into audio/voice packets and transmits them to the remote participants. Thus, during the voice conference, each of the audio connections may carry both audio packets that convey the unique ultrasound signal, as well as audio packets that convey regular voice/speech. At the remote participants, (i) the voice packets are decoded to recover voice, which is played back through local loudspeakers, and (ii) the unique ultrasound signal is decoded to recover the unique digital ID.

At 403, the participant determines locally attributed voice quality degradation. For example, the participant performs a local ultrasound loopback test, and may determine whether local processing and memory resources are overloaded. The participant records the results of such tests, e.g., whether they pass or fail.

At 404, the participant collects, from meeting supervisor 104, voice quality degradation information specifically generated by the meeting supervisor. The participant may localize degraded voice quality to particular ones of the remote participants based, in part, on the voice quality degradation information specifically generated by meeting supervisor 104.

At 405, the participant collects receiver records from one or more databases, e.g., the participant queries meeting supervisor 104 for the receiver records, or retrieves them locally. The receiver records include the status indicators/indications, transmitted by corresponding ones of the remote participants to meeting supervisor 104, of whether the corresponding ones of the remote participants (i) did or did not detect the unique ultrasound signals, and (ii) did or did not pass (i.e. passed or failed) their local ultrasound loopback tests.

At 406, the participant analyzes results of its local ultrasound feedback test and the indications in the collected receiver records. For example, based on the indications in the receiver records, the participant identifies which of the remote participants detected the unique ultrasound signals, and which of the remote participants passed/failed their local ultrasound loopback tests. Based on results of the identifying, the participant localizes degraded voice quality (if any exists) to particular ones of the participants, including the local participant (i.e., itself) and the remote participants. Together, the identifying and the localizing represent determining or inferring which of the particular participants are experiencing voice quality degradation.

At 407, the participant generates for display visual indications of degraded voice quality for the particular ones of the participants to which the degraded voice quality is localized. The participant presents the indications of degraded voice quality locally, and transmits the indications to the remote participants for display. This is referred to as "updating all participant status."

With reference to FIG. 5, there is a flowchart of an example method 500 of supporting localizing degraded voice quality to particular participants among participants in an online voice conference, performed by meeting supervisor 104.

At 501, meeting supervisor 104 initializes an online voice conference (e.g., the voice conference referenced above in connection with the description of method 400). At 502, upon receiving join requests and registration requests for the voice conference from the participants, meeting supervisor distributes to each of the participants (i) a unique digital ID of the sender, and (ii) periodicity information for generation of the unique ultrasound signals.

At 503*a*, meeting supervisor 104 determines an ingress ultrasound pulse metric based on an analysis of ultrasound information of edge participants/devices in the voice conference. Meeting supervisor 104 stores the metric in database (DB) 108. At 503b, upon receiving ultrasound confirmation messages transmitted by participants operating in the receiver role, meeting supervisor 104 stores the information carried in the messages (referred to as the "receiver provided ultrasound pulse metric" in FIG. 5) into receiver records of database 108. Meeting supervisor 104 may periodically synchronize database 108 with databases local to each of the participants, as described above.

With reference to FIG. 6, there is a flowchart of an example method 600 of supporting localizing degraded voice quality to particular participants among participants in an online voice conference, performed by a participant operating as a listener/receiver among the participant devices.

At 601, the participant registers with meeting supervisor 104 as a listener/receiver for the voice conference.

At 602, the participant listens for/expects to receive a unique ultrasound signal (e.g., the periodic ultrasound pulses) from a participant who is a sender.

At 603, the participant "filters-in" the unique ultrasound signal when received into audio codec 222, meaning that the participant does not apply frequency pre-filtering to the received signal that might otherwise suppress ultrasound frequencies in the received signal.

At 604a, the participant determines whether there is localized hardware-based degradation, e.g., using a local ultrasound loopback test, or other tests.

At 604b, the participant determines whether there is voice quality degradation, e.g., determines whether the unique ultrasound signal has been detected successfully.

The participant sends ultrasound confirmation messages to meeting supervisor 104 to convey results determined at 604a and 604b.

Figure 7:
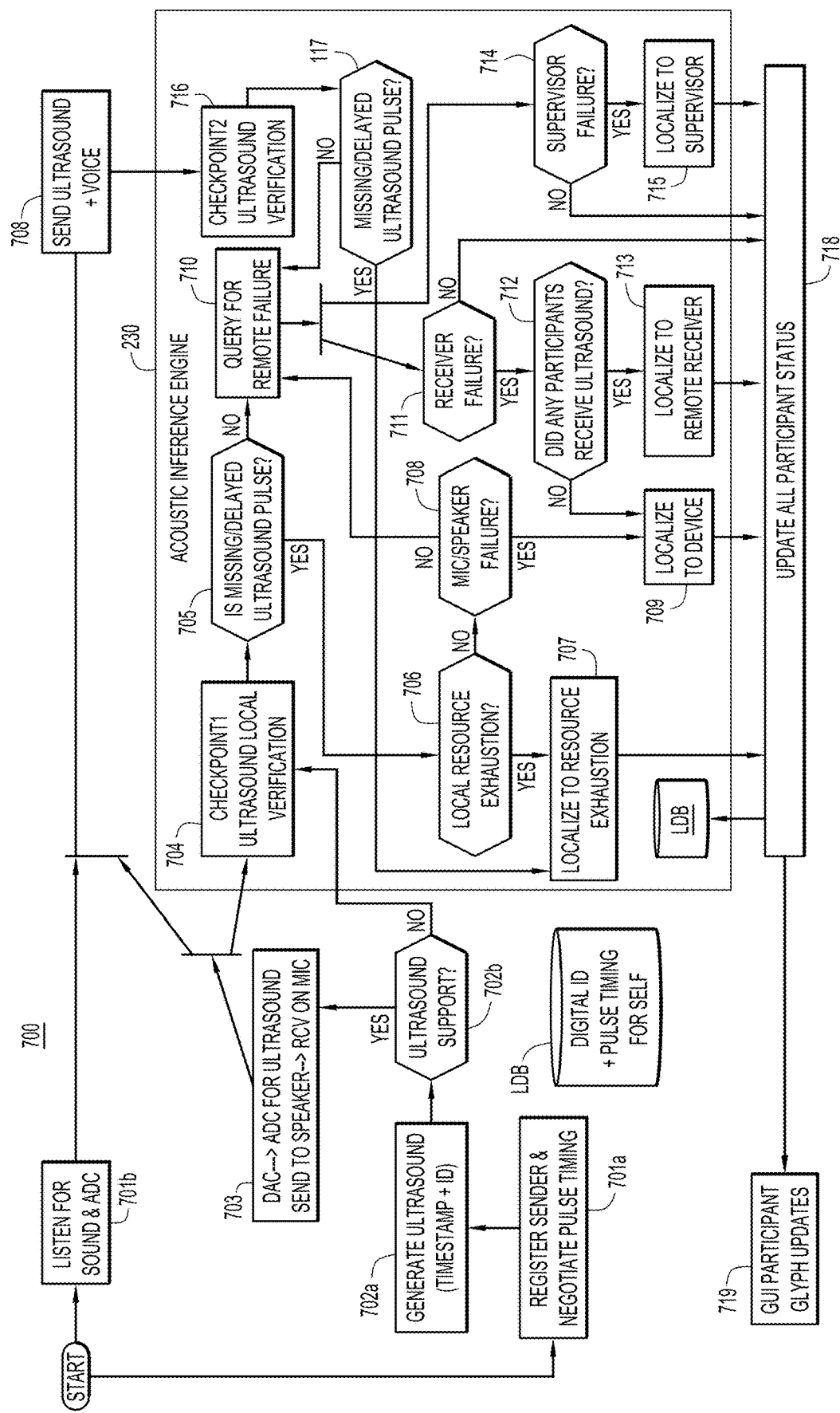
FIG. 7 shows operations expanding on the method of FIG. 4, according to an example embodiment FIG. 8 show operations expanding on the method of FIG. 6, according to an example embodiment.
Figure 8:
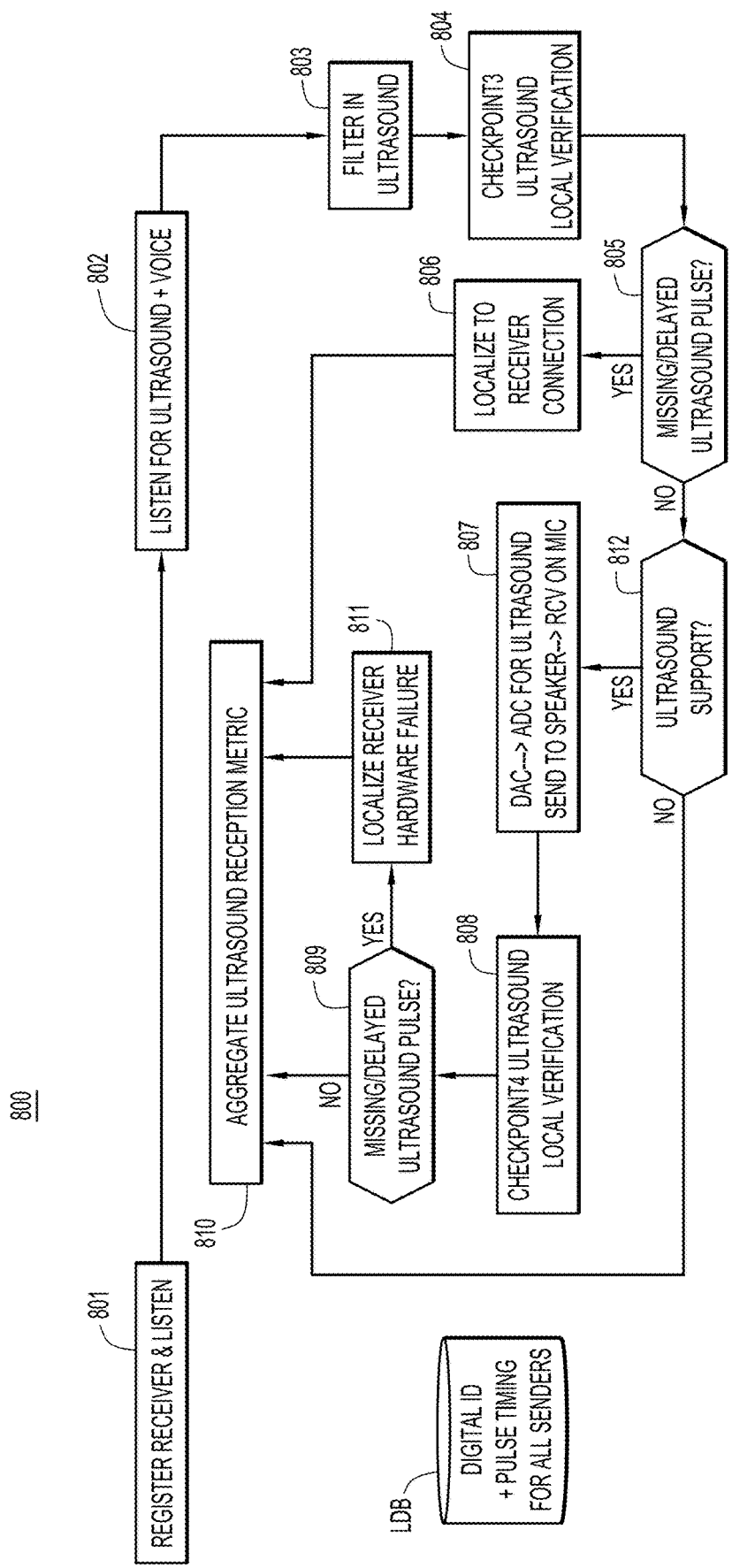

FIGS. 7 and 8 depict operations expanding on the operations shown in FIGS. 4 and 6, respectively. Some of the operations shown in FIGS. 7 and 8 overlap with corresponding operations shown in FIGS. 4 and 6.

With reference to FIG. 7, there are shown operations 700 expanding on the operations of FIG. 4, performed by the sender.

At 701a, the sender registers with meeting supervisor 104 and receives pulse timing/periodicity information. The sender connects to the remote participants (also referred to as "receivers"). At 702a, the sender generates unique ultrasound signals and transmits them to the remote participants. At 702b, the sender determines whether it is configured with sound equipment (e.g., microphone, loudspeaker, codec) that can operate at ultrasound. If yes/true, flow proceeds to 703. If no/false, flow proceeds to 704.

At 703, the sender performs a local ultrasound loopback test, which sends ultrasound through a digital-to-analog convert (DAC), an analog-to-digital converter (ADC), a local loudspeaker, and a local microphone. Flow proceeds from 703 to both 704 and 708.

At 704, checkpoint1, the sender performs ultrasound local verification, and flow proceeds to 705. At 705, the sender determines whether the ultrasound (pulse) was missing or delayed, i.e., not detected successfully. If yes, flow proceeds to 706. If no, flow proceeds to 710.

At 706, the sender determines whether it is experiencing local resource exhaustion (e.g., out of processor bandwidth or memory). If yes, flow proceeds to 707, where the sender localizes degradation to its own resource exhaustion, and then flow proceeds to 718, where the sender updates all participant status to reflect the resource exhaustion. If the sender determines that it is not experiencing resource exhaustion, flow proceeds to 708, where the sender determines whether there is a microphone (or loudspeaker) failure. If there is a microphone (or loudspeaker) failure, flow proceeds to 709, where the sender localizes failure to a local device, and then flow proceeds to 718, where the sender updates all participant status to reflect the local device failure. Alternatively, if the sender determines there is no microphone (or loudspeaker) failure, flow proceeds to 710.

At 710, the sender queries for remote failures (i.e., collects indications of failures at remote participants operating as listeners/receivers), and then flow proceeds to both 711 and 714. At 711, the sender determines whether there is a remote failure, i.e., whether there is a remote participant failure. If no, flow proceeds to 718, where the sender updates all participant status accordingly. If yes, flow proceeds to 712, where the sender determines whether any of the remote participants successfully detected the unique ultrasound signals (i.e., whether one or more of the remote participants detect the unique ultrasound signals). If yes, flow proceeds to 713, where the sender localizes failure to the remote participants that did not successfully detect the unique ultrasound signals, and then flow proceeds to 718, where the sender updates all participant status accordingly. If the test at 712 fails (i.e., none of the remote participants detected the unique ultrasound signals), then flow proceeds to 709, where the sender localizes failure to a local device, and then flow proceeds to 718, where the sender updates all participant status to reflect the local device failure.

At 714, the sender determines whether there is a failure at meeting supervisor 104. If yes, flow proceeds to 715, where the sender localizes failure to the meeting supervisor, and then flow proceeds to 718, where the sender updates all participant status accordingly. If there is not a failure at meeting supervisor 104, flow proceeds to 718, where the sender updates all participant status accordingly.

The flow inputs to 718, i.e., the updates to all participant status, are stored to a local database LDB of the sender. The local database LDB also stores the unique digital ID and pulse timing/periodicity information provided to the sender by meeting supervisor 104. Flow proceeds from 718 to 719, where the sender (i) updates UI information for the voice conference in accordance with the updates to all participant status, (ii) displays the updated UI information, and (iii) sends the updated UI information to the remote participants.

At 701b, the sender listens for audio packets carrying voice (referred to more generally as "voice signals") transmitted by other participants, and flow proceeds to 708. At 708, the sender sends the unique ultrasound signal and voice to remote participants, and flow proceeds to 716, checkpoint 2, ultrasound verification. Then, flow proceeds to 717, where the sender determines whether the unique ultrasound pulses are missing or delayed, i.e. are not successfully detected. If no, flow proceeds to 710, where the sender queries for remote failure. Otherwise, flow proceeds to 707, where the sender localizes failure to resource exhaustion.

With reference to FIG. 8, there are shown operations 800 expanding on the operations of FIG. 6, performed by the participant operating in the role of a listener/receiver.

At 801, the participant registers as a receiver with meeting supervisor 104. At 802, the participant listens for a unique ultrasound signal and voice (packets). At 803, the participant "filters-in" ultrasound to the local audio codec. At 804, checkpoint3, the participant performs ultrasound local verification, which involves 805. At 805, the participant determines whether ultrasound pulses are missing or delayed. If yes (missing pulses), flow proceeds to 806, where the participant localizes failure to the participant's connection to the network (i.e., the receiver connection), and then flow proceeds to 810. At 810, the participant aggregates ultrasound reception metrics, and sends an ultrasound confirmation message to meeting supervisor 104 indicating the status.

If ultrasound pulses are detected successfully (no missing pulses), flow proceeds from 805 to 812, where the participant determines whether there is ultrasound support locally. If there is no ultrasound support locally, flow proceeds from 812 to 810, where the sender aggregates ultrasound reception metrics, and sends an ultrasound confirmation message to meeting supervisor 104 indicating the status. If there is ultrasound support locally, flow proceeds to 807, where the participant begins a local ultrasound loopback test. Flow proceeds to 808, checkpoint4, where the participant performs ultrasound local verification based on results of the loopback test, and then flow proceeds to 809. At 809, the participant determines whether the locally generated ultrasound pulses are missing or delayed. If yes, flow proceeds to 811, where the participant localizes the failure to participant/receiver hardware, and then flow proceeds to 810. If no, flow proceeds from test 809 to 810.

Figure 9:
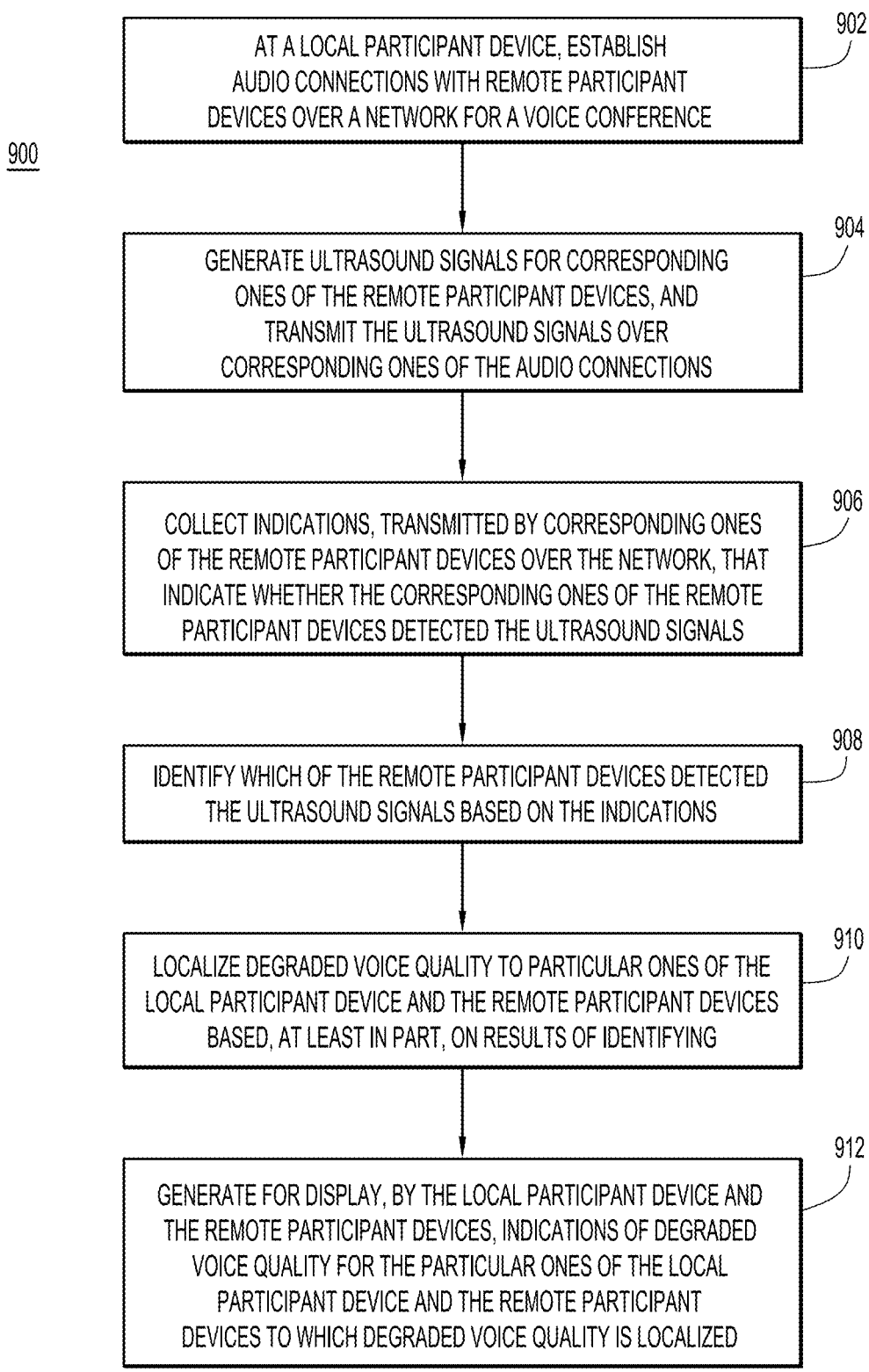
FIG. 9 is a flowchart of a method of performing ultrasound-based localization of voice quality degradation during an online voice conference, performed by a participant device operating in a presenter or sender role.

With reference to FIG. 9, there is a flowchart of an example method 900 of performing ultrasound-based localization of voice quality degradation during an online voice conference, performed by a local participant device operating in a sender role. Method 900 includes operations described above.

At 902, a local participant device establishes audio connections with remote participant devices over a network for an online voice conference.

At 904, the local participant device generates ultrasound signals for corresponding ones of the remote participant devices, and transmits the ultrasound signals over corresponding ones of the audio connections. The ultrasound signals may include periodic ultrasound pulses (i.e., ultrasound pulse trains) that have periodicities for corresponding ones of the remote devices as configured by a meeting supervisor, and that are encoded with a unique digital ID of the local participant. In an example, the local participant device employs an audio codec to encode ultrasound into audio packets that convey the ultrasound, and then transmits the audio packets (that represent the ultrasound signals) over the audio connections. In addition, the local participant device uses the audio codec to encode voice detected by a microphone of the local participant device into audio packets that convey the voice, and then transmits the audio packets carrying voice (more generally, "voice signals") over the audio connections. Both ultrasound and voice are transmitted during the voice conference.

At 906, the local participant device collects/accesses indications, transmitted by corresponding ones of the remote participant devices over the network, of whether the corresponding ones of the remote participant devices detected the ultrasound signals transmitted by the local participant device.

At 908, the local participant device identifies which of the remote participant devices did or did not detect the ultrasound signals based on the indications.

At 910, the local participant device localizes degraded voice quality to particular ones of the local participant device and the remote participant devices based, at least in part, on results of identifying operation 908.

In various examples, when the identifying of operation 908 indicates that none of the remote participant devices has detected the ultrasound signals, the localizing operation 910 includes localizing degraded voice quality to the local participant device. When the identifying indicates that at least one of the remote participant devices has detected the ultrasound signals, but one or more of the remote participant devices have not detected the ultrasound signals, the localizing includes localizing degraded voice quality to each of the one or more of the remote participant devices that have not detected the ultrasound signals.

The local participant may also perform a local ultrasound loopback test that passes or fails when an ultrasound signal transmitted by a loudspeaker of the local participant device is detected or not detected using the microphone of the local participant device. The local participant may localize degraded voice quality to the local participant device when the local ultrasound loopback test fails.

At 912, the local participant device generates for display visual indications of degraded voice quality for the particular ones of the local participant device and the remote participant devices to which degraded voice quality is localized. The local participant device presents the indications of degraded voice quality on a local UI for the voice conference. The local participant device transmits the indications of degraded voice quality to the remote participant devices to be displayed by the remote participant devices.

Figure 10:
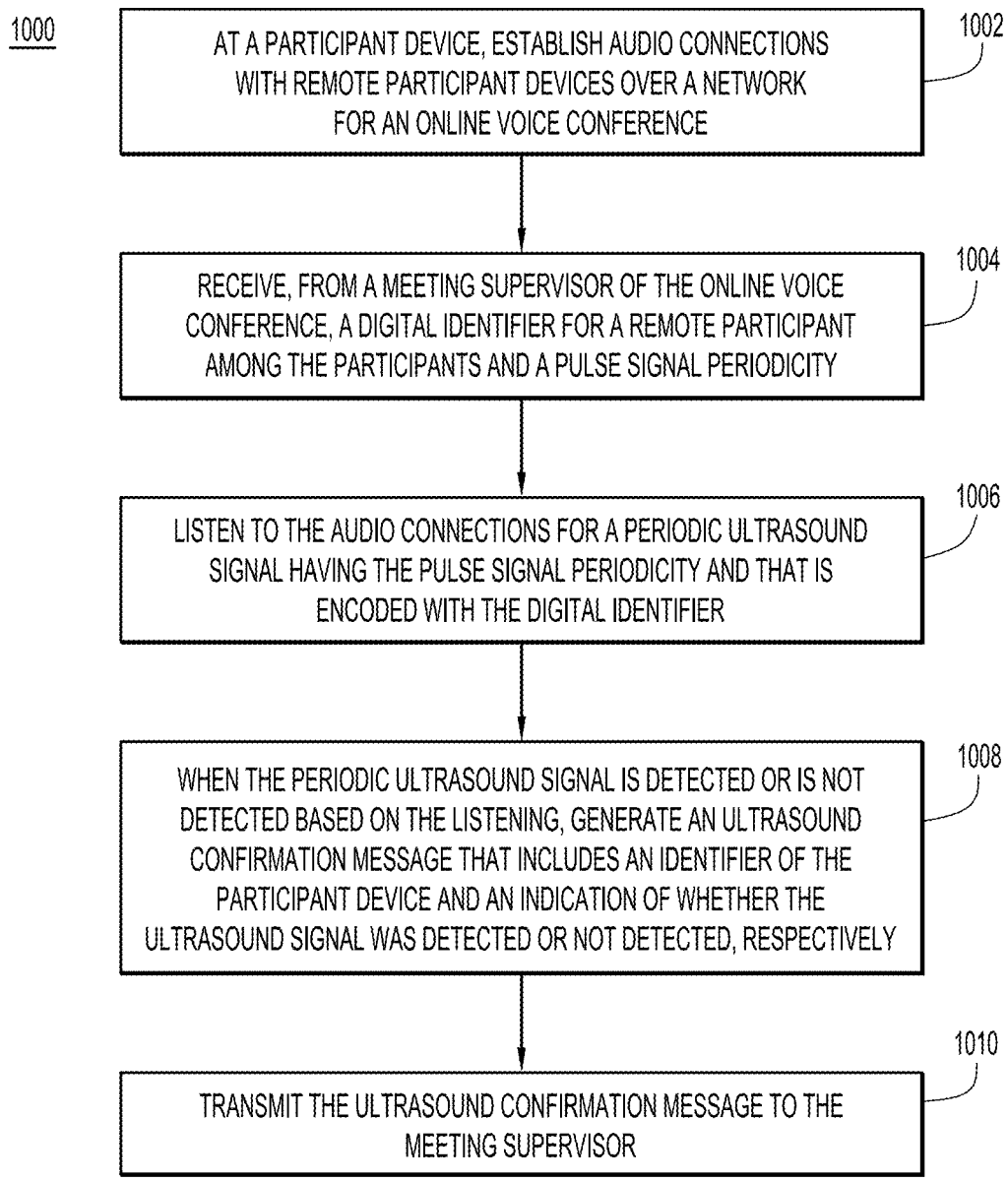
FIG. 10 is a flowchart of a method of performing ultrasound-based localization of voice quality degradation during an online voice conference, performed by a participant device operating in a receiver role.

With reference to FIG. 10, there is a flowchart of an example method 1000 of performing ultrasound-based localization of voice quality degradation during an online voice conference, performed by a participant device operating in a receiver role. Method 1000 includes operations described above.

At 1002, the participant establishes audio connections with remote participant devices over a network for an online voice conference.

At 1004, the participant device receives, from a meeting supervisor of the online voice conference, a digital identifier for a remote participant among the participants and a pulse signal periodicity.

At 1006, the participant device listens to the audio connections for a periodic ultrasound signal having the pulse signal periodicity and that is encoded with the digital identifier.

At 1008, when the periodic ultrasound signal is detected or is not detected while listening in operation 1006, the participant device generates an ultrasound confirmation message that includes an identifier of the local participant device and an indication of whether the ultrasound signal was detected or was not detected, respectively.

Note that during the voice conference, the participant device receives audio packets that carry voice from the remote participants, and decodes the audio packets using a local codec to recover the voice. The participant device reproduces or plays-back the voice locally through a loudspeaker. The participant device may also receive audio packets that carry ultrasound (e.g., such audio packets may represent the periodic ultrasound signal for which the participant device is listening), and decodes the audio packets to recover the ultrasound. The participant device may or may not reproduce the ultrasound through the loudspeaker. In either case, a user of the participant device cannot hear the ultrasound. Thus, the ultrasound does not interfere with voice quality perceived by the user. At the same time, the ultrasound is used to determine voice quality degradation by a sender device.

At 1010, the participant device transmits the ultrasound confirmation message (a digital message/packet) to the meeting supervisor.

In addition, the participant device may perform a local ultrasound loopback test that passes or fails when an ultrasound signal transmitted by a loudspeaker of the participant device is detected or not detected using a microphone of the local participant device, respectively. When the local loopback test passes or fails, the participant device generates the ultrasound confirmation to further include an indication that the local ultrasound loopback test passed or failed, respectively.

In an example of method 900/1000, after the start of the voice conference, e.g., after the voice conference has been established and after operation 902/1002, operations 904-912/1004-1010 may be performed to localize and display degraded voice quality while the participants are talking, e.g., while both audio packets carrying ultrasound (more generally, "ultrasound signals") and audio packets carrying speech/voice (more generally "voice signals") are being transmitted by the participant devices. On the other hand, in another example, shortly after the start of the voice conference, e.g., after the voice conference has been established and after operation 902/1002, operations 904-912/1004-1010 may be performed to localize and display degraded voice quality while the participants are silent, e.g., before any participant actually speaks. In other words, operations 904-912/1004-1010 may occur before audio packets carrying voice/speech are transmitted by the participants. In this example, initially, only audio packets carrying ultrasound are exchanged between the participants, at least until conversation begins. Thus, methods 900/1000 rely on ultrasound signals to localize voice degradation, without exchanging (or in the absence of) voice/speech packets between participants.

Figure 11:
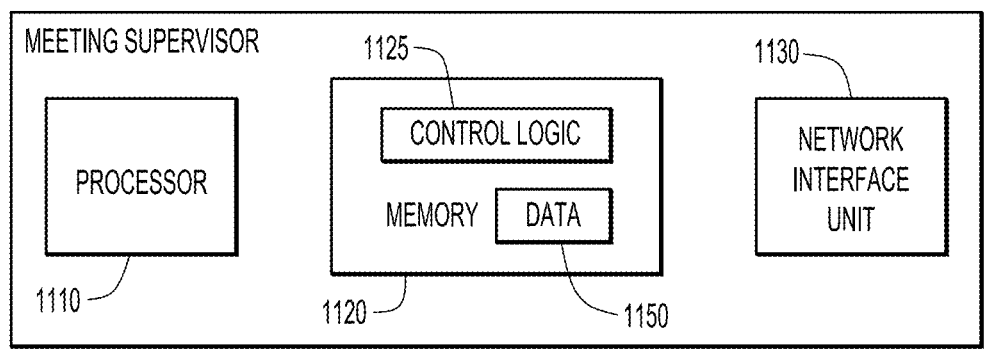
FIG. 11 is a block diagram of a server device configured to implement the meeting supervisor, according to an embodiment.

With reference to FIG. 11, there is shown a simplified block diagram of an example server device 1100 (also referred to simply as "server 1100") for implementing meeting supervisor 104. Server 1100 includes a processor 1110 to process instructions relevant to managing a voice conference as described herein, memory 1120 to store a variety of data and software instructions, including server control logic/software 1125. Server 1100 also includes an NIU 1130 similar to NIUs 208 described above that enables network communications so that the server can communicate with other devices, e.g., participant devices 102. Memory 1120 may comprise read only memory (ROM), random access memory (RAM), magnetic disk storage media devices, optical storage media devices, flash memory devices, electrical, optical, or other physical/tangible (e.g., non-transitory) memory storage devices. Processor 1110 is, for example, a microprocessor or microcontroller that executes instructions for implementing the processes described herein. Thus, in general, memory 1120 may comprise one or more tangible (non-transitory) computer readable storage media (e.g., a memory device) encoded with software (e.g., the server control logic/software 1125) comprising computer executable instructions and when the software is executed (by the processor 1110) it is operable to perform the operations described herein.

Memory 1120 also stores data 1150 generated and used by logic 1125. Memory 1120 may include database 108, for example.

In summary, embodiments presented herein provide proactive discovery of voice degradation from the point of view of a meeting participant or attendee to each other meeting participant. The embodiments leverage ultrasound frequency transmission between meeting participants to detect the voice quality degradation. Features of the embodiments include:

a. Employing an ultrasonic frequency audio mechanism between participants to proactively detect and isolate voice faults.
  b. Classifying connection voice quality as edges/connections between self and other participants, and automatically classifying each of the other participants.
  c. Decorating each of the participant UIs with glyphs/annotations with regard to the voice quality classification. For example, participant X may appear to be classified as low voice quality with regard to participant A, but be perceived as high voice quality to participant B.

In an example, assume there are 4 participant devices, including participant device A, participant device B, participant device C, and participant device D in a voice conference. An application on each device sends/receives agreed upon patterns of ultrasound frequency signatures on a continuous basis. These connection edges form a star topology. Assume now that participant B, has a local network issue.
  a. All other participants collectively classify and flag participant B as having degraded audio quality.
  b. From participant B's perspective, it finds itself classified as degraded based on tests from peers that collectively declare participant B as struggling to maintain voice quality.

In a case of inter-region connectivity disruptions, there are islands of participants that may appear to have good quality only to peers in the same region.

The summary/results of the ultrasound probing is presented in conference UIs, so that each operator of a participant device is able to view whether the operator is heard by conference peers and, reciprocally, is able to hear the conference peers. There are multiple different modes of execution in the embodiments, including:
  a. Real-time active: in which case, as the presenter speaks, lost ultrasound information implies a fault in audio delivery.
  b. Real-time proactive: in which case, the presenter, though silent (in the audible spectrum), is able to infer connection issues with respect to other participants by leveraging the ultrasound frequency.
  c. Batch based, reactive: where, based on fuzzy logic or equivalent artificial intelligence, a threshold is reached, and only then can connection voice quality and associated fault isolation be confirmed.

Variations and Implementations

Embodiments described herein may include or be implemented in one or more networks, which can represent a series of points and/or network elements of interconnected communication paths for receiving and/or transmitting messages (e.g., packets of information) that propagate through the one or more networks. These network elements (which may include participant devices and a meeting supervisor) offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4 G/5 G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, in one form, a method is provided comprising: at a local participant device, establishing audio connections with remote participant devices over a network for an online voice conference; generating ultrasound signals for corresponding ones of the remote participant device; transmitting the ultrasound signals over corresponding ones of the audio connections; collecting indications, transmitted by corresponding ones of the remote participant devices over the network, of whether the corresponding ones of the remote participant devices detected the ultrasound signals; identifying which of the remote participant devices detected the ultrasound signals based on the indications; and localizing degraded voice quality to particular ones of the local participant device and the remote participant devices based, at least in part, on results of identifying.

In another form, an apparatus is provided comprising: a network interface unit to communicate with a network; and a processor, of a local participant device, coupled to the network interface unit and configured to perform: establishing audio connections with remote participant devices over the network for an online voice conference; generating ultrasound signals for corresponding ones of the remote participant devices; transmitting the ultrasound signals over corresponding ones of the audio connections; collecting indications, transmitted by corresponding ones of the remote participant devices over the network, of whether the corresponding ones of the remote participant devices detected the ultrasound signals; identifying which of the remote participant devices detected the ultrasound signals based on the indications; and localizing degraded voice quality to particular ones of the local participant device and the remote participant devices based, at least in part, on results of identifying.

In yet another form, a non-transitory computer readable medium encoded with instructions is provided. The instructions, when executed by a processor of a local participant device, cause the processor to perform: establishing audio connections with remote participant devices over a network for an online voice conference; generating ultrasound signals for corresponding ones of the remote participant devices; transmitting the ultrasound signals over corresponding ones of the audio connections; collecting indications, transmitted by corresponding ones of the remote participant devices over the network, of whether the corresponding ones of the remote participant devices detected the ultrasound signals; identifying which of the remote participant devices detected the ultrasound signals based on the indications; and localizing degraded voice quality to particular ones of the local participant device and the remote participant devices based, at least in part, on results of identifying.

In another form, a method is provided comprising: at a participant device, establishing audio connections with remote participant devices over a network for an online voice conference; receiving, from a meeting supervisor of the online voice conference, a digital identifier for one of the remote participant devices and a pulse signal periodicity; listening to the audio connections for a periodic ultrasound signal having the pulse signal periodicity and that is encoded with the digital identifier; when the periodic ultrasound signal is detected or is not detected based on listening, generating an ultrasound confirmation message that includes an identifier of the participant device and a first indication of whether the periodic ultrasound signal was detected or was not detected, respectively; and transmitting the ultrasound confirmation message to the meeting supervisor.

The method further comprises, at the participant device: performing a local ultrasound loopback test that passes or fails when an ultrasound signal transmitted by a loudspeaker of the participant device is detected or is not detected using a microphone of the participant device, respectively; and when the local ultrasound loopback test passes or fails, generating the ultrasound confirmation message to further include a second indication that the local ultrasound loopback test passed or failed, respectively The above description is intended by way of example only. Various modifications and structural changes may be made therein without departing from the scope of the concepts described herein and within the scope and range of equivalents of the claims.

What is claimed is:

1. A method comprising:
at a local participant device:
establishing audio connections with remote participant devices over a network for an online voice conference to be supervised by a controller;
generating, using an audio codec, ultrasound signals encoded into audio packets, wherein the ultrasound signals are encoded with a digital identifier of the local participant device;
transmitting the audio packets to, and for detection by, the remote participant devices;
collecting information conveyed in ultrasound confirmation messages transmitted by the remote participant devices to the controller in response to the ultrasound signals, wherein each ultrasound confirmation message includes a data packet having an identifier of a remote participant device, the digital identifier of the local participant device, and an indication of whether the remote participant device successfully detected one of the ultrasound signals;
identifying which of the remote participant devices detected the ultrasound signals based on the information; and
localizing degraded voice quality to particular ones of the local participant device and the remote participant devices based, at least in part, on results of identifying.

2. The method of claim 1, further comprising, at the local participant device:
generating for display, by the local participant device and the remote participant devices, indications of degraded voice quality for the particular ones of the local participant device and the remote participant devices to which the degraded voice quality is localized.

3. The method of claim 1, further comprising, at the local participant device:
using the audio codec, encoding voice detected by a microphone of the local participant device into audio packets that convey the voice, and second transmitting the audio packets that convey the voice over the audio connections.

4. The method of claim 1, wherein the ultrasound signals are in a frequency range above 20 kHz.

5. The method of claim 1, wherein:
the data packet further includes an indication that an ultrasound loopback test performed by the remote participant device failed or passed.

6. The method of claim 1, wherein:
generating the ultrasound signals includes generating the ultrasound signals as periodic ultrasound pulses.

7. The method of claim 6, wherein:
generating includes generating the ultrasound signals as the periodic ultrasound pulses based on periodicities as set by the controller.

8. The method of claim 1, further comprising, at the local participant device:

when identifying indicates that none of the remote participant devices has detected the ultrasound signals, localizing includes localizing the degraded voice quality to the local participant device.

9. The method of claim 1, further comprising, at the local participant device:
when identifying indicates that at least one of the remote participant devices has detected the ultrasound signals, but one or more of the remote participant devices have not detected the ultrasound signals, localizing includes localizing the degraded voice quality to each of the one or more of the remote participant devices that have not detected the ultrasound signals.

10. The method of claim 1, further comprising, at the local participant device:
performing a local ultrasound loopback test that passes or fails when an ultrasound signal transmitted by a loudspeaker of the local participant device is detected or not detected using a microphone of the local participant device, respectively; and
localizing the degraded voice quality to the local participant device when the local ultrasound loopback test fails.

11. The method of claim 1, further comprising, at each of the remote participant devices:
listening for an ultrasound signal on one of the audio connections; and
when the ultrasound signal is detected or is not detected based on listening, second transmitting, to the network, an ultrasound confirmation message indicating that the ultrasound signal was detected or was not detected, respectively.

12. The method of claim 1, wherein:
the controller includes a database for storing status information associated with the local participant device and the remote participant devices.

13. The method of claim 1, further comprising, at the local participant device:
performing generating, transmitting, collecting, identifying, and localizing without exchanging voice signals between the local participant device and the remote participant devices.

14. An apparatus comprising:
a network interface unit to communicate with a network; and
a processor, of a local participant device, coupled to the network interface unit and configured to perform:
establishing audio connections with remote participant devices over the network for an online voice conference to be supervised by a controller;
generating, using an audio codec, ultrasound signals encoded into audio packets, wherein the ultrasound signals are encoded with a digital identifier of the local participant device;
transmitting the audio packets to, and for detection by, the remote participant devices;
collecting information conveyed in ultrasound confirmation messages transmitted by the remote participant devices to the controller in response to the ultrasound signals, wherein each ultrasound confirmation message includes a data packet having an identifier of a remote participant device, the digital identifier of the local participant device, and an indication of whether the remote participant device successfully detected one of the ultrasound signals;
identifying which of the remote participant devices detected the ultrasound signals based on the information; and
localizing degraded voice quality to particular ones of the local participant device and the remote participant devices based, at least in part, on results of identifying.

15. The apparatus of claim 14, wherein the processor is further configured to perform:
generating for display, by the local participant device and the remote participant devices, indications of degraded voice quality for the particular ones of the local participant device and the remote participant devices to which the degraded voice quality is localized.

16. The apparatus of claim 14, wherein the processor is further configured to perform:
using the audio codec, encoding voice detected by a microphone of the local participant device into audio packets that convey the voice, and second transmitting the audio packets that convey the voice over the audio connections.

17. The apparatus of claim 14, wherein the ultrasound signals are in a frequency range above 20 kHz.

18. A non-transitory computer readable medium encoded with instructions that, when executed by a processor of a local participant device, cause the processor to perform:
establishing audio connections with remote participant devices over a network for an online voice conference to be supervised by a controller;
generating, using an audio codec, ultrasound signals encoded into audio packets, wherein the ultrasound signals are encoded with a digital identifier of the local participant device;
transmitting the audio packets to, and for detection by, the remote participant devices;
collecting information conveyed in ultrasound confirmation messages transmitted by the remote participant devices to the controller in response to the ultrasound signals, wherein each ultrasound confirmation message includes a data packet having an identifier of a remote participant device, the digital identifier of the local participant device, and an indication of whether the remote participant device successfully detected one of the ultrasound signals;
identifying which of the remote participant devices detected the ultrasound signals based on the information; and
localizing degraded voice quality to particular ones of the local participant device and the remote participant devices based, at least in part, on results of identifying.

19. The non-transitory computer readable medium of claim 18, further comprising instructions to cause the processor to perform:
generating for display, by the local participant device and the remote participant devices, indications of degraded voice quality for the particular ones of the local participant device and the remote participant devices to which the degraded voice quality is localized.

20. The non-transitory computer readable medium of claim 18, further comprising instructions to cause the processor to perform:
using the audio codec, encoding voice detected by a microphone of the local participant device into audio packets that convey the voice, and second transmitting the audio packets that convey the voice over the audio connections.

* * * * *